(12) United States Patent
Stanley et al.

(10) Patent No.: US 7,613,656 B2
(45) Date of Patent: Nov. 3, 2009

(54) COUPON PAYMENT SYSTEM

(75) Inventors: Jennifer Stanley, Brooklyn, NY (US); Alan S. Koenigsberg, Upper Montclair, NJ (US); Hector E. Sandoval, Aurora, IL (US)

(73) Assignee: JP Morgan Chase Bank, New York, NY (US)

( * ) Notice: Subject to any disclaimer, the term of this patent is extended or adjusted under 35 U.S.C. 154(b) by 0 days.

(21) Appl. No.: 10/915,820

(22) Filed: Aug. 11, 2004

(65) Prior Publication Data

US 2005/0038743 A1      Feb. 17, 2005

Related U.S. Application Data

(60) Provisional application No. 60/494,307, filed on Aug. 11, 2003.

(51) Int. Cl.
*G06Q 40/00*      (2006.01)
(52) U.S. Cl. .............................. 705/40; 705/35; 705/39
(58) Field of Classification Search ................ 705/35, 705/34, 39, 44, 45, 35 R, 40, 14, 26, 42, 1, 705/78, 76, 67, 36 R; 235/379, 375, 380
See application file for complete search history.

(56) References Cited

U.S. PATENT DOCUMENTS

| | | |
|---|---|---|
| 3,653,480 A | 4/1972 | Yamamoto et al. |
| 4,205,780 A | 6/1980 | Burns |
| 4,321,672 A | 3/1982 | Thomson |
| 4,355,372 A | 10/1982 | Johnson et al. |
| 4,396,985 A | 8/1983 | Ohara |
| 4,495,018 A | 1/1985 | Vohrer |
| 4,617,457 A | 10/1986 | Myers |
| 4,633,397 A | 12/1986 | Macco |
| 4,672,377 A | 6/1987 | Murphy |
| 4,694,397 A | 9/1987 | Vignola |
| 4,700,055 A | 10/1987 | Kashkashian, Jr. |
| 4,722,054 A | 1/1988 | Fukushima |
| 4,745,468 A | 5/1988 | Von Kohorn |
| 4,752,877 A | 6/1988 | Roberts |
| 4,774,664 A | 9/1988 | Campbell et al. |

(Continued)

FOREIGN PATENT DOCUMENTS

EP      0 099 999 A2      2/1984

(Continued)

OTHER PUBLICATIONS

Priya, Malhotra Clearing House Enumerates E-Payments Ills, Aug. 13, 2002, American Banker.*

(Continued)

*Primary Examiner*—Kelly Campen
(74) *Attorney, Agent, or Firm*—Lowenstein Sandler PC

(57) ABSTRACT

As an alternative to bill payments made with paper checks, customers are provided with "Sign-to-Pay" payment coupons along with their bills. A customer elects to pay the bill either by check or by returning the "Sign-to-Pay" payment coupon. The coupon will not contain the customer's checking account information. However, the payment amount indicated on the coupon will subsequently be deducted from the customer's checking account. Preferably, bill payments will be made through the Automated Clearing House (ACH) network which is an efficient and less expensive alternative to the traditional check clearing process.

17 Claims, 3 Drawing Sheets

U.S. PATENT DOCUMENTS

| | | |
|---|---|---|
| 4,797,911 A | 1/1989 | Marks |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,914,587 A | 4/1990 | Clouse |
| 4,926,255 A | 5/1990 | Von Kohorn |
| 4,931,793 A | 6/1990 | Fuhrmann et al. |
| 4,932,046 A | 6/1990 | Katz et al. |
| 4,948,174 A | 8/1990 | Thomson et al. |
| 4,972,504 A | 11/1990 | Daniel, Jr. |
| 4,974,878 A | 12/1990 | Josephson |
| 4,988,849 A | 1/1991 | Sasaki |
| 4,992,646 A | 2/1991 | Collin |
| 5,023,904 A | 6/1991 | Kaplan |
| 5,041,972 A | 8/1991 | Frost |
| 5,050,207 A | 9/1991 | Hitchcock |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Benton et al. |
| 5,136,502 A | 8/1992 | Van Remortel et al. |
| 5,157,717 A | 10/1992 | Hitchcock |
| 5,175,682 A | 12/1992 | Higashiyama |
| 5,179,584 A | 1/1993 | Tsumura |
| 5,198,975 A | 3/1993 | Baker et al. |
| 5,225,978 A | 7/1993 | Peterson |
| 5,237,159 A | 8/1993 | Stephens |
| 5,259,023 A | 11/1993 | Katz |
| 5,260,778 A | 11/1993 | Kauffman |
| 5,283,829 A | 2/1994 | Anderson |
| 5,287,269 A | 2/1994 | Dorrough |
| 5,311,594 A | 5/1994 | Penzias |
| 5,315,508 A | 5/1994 | Bain et al. |
| 5,321,238 A | 6/1994 | Kamata et al. |
| 5,326,959 A | 7/1994 | Perazza |
| 5,336,870 A | 8/1994 | Hughes |
| 5,350,906 A | 9/1994 | Brody |
| 5,367,581 A | 11/1994 | Abel et al. |
| 5,373,550 A | 12/1994 | Campbell |
| 5,383,113 A | 1/1995 | Knight |
| 5,396,417 A | 3/1995 | Burks |
| 5,402,474 A | 3/1995 | Miller |
| 5,412,190 A | 5/1995 | Josephson et al. |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,465,206 A | 11/1995 | Hilt |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,490,060 A | 2/1996 | Malec |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,523,942 A | 6/1996 | Tyler |
| 5,532,464 A | 7/1996 | Josephson et al. |
| 5,532,920 A | 7/1996 | Hartrick |
| 5,544,040 A | 8/1996 | Gerbaulet |
| 5,544,046 A | 8/1996 | Niwa |
| 5,550,734 A | 8/1996 | Tarter et al. |
| 5,551,021 A | 8/1996 | Harada |
| 5,555,299 A | 9/1996 | Maloney et al. |
| 5,557,515 A | 9/1996 | Abbruzzese et al. |
| 5,559,855 A | 9/1996 | Dowens et al. |
| 5,561,707 A | 10/1996 | Katz |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,594,791 A | 1/1997 | Szlam et al. |
| 5,599,528 A | 2/1997 | Igaki |
| 5,603,025 A | 2/1997 | Tabb |
| 5,615,109 A | 3/1997 | Eder |
| 5,615,341 A | 3/1997 | Srikant |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett |
| 5,679,938 A | 10/1997 | Templeton |
| 5,679,940 A | 10/1997 | Templeton |
| 5,684,863 A | 11/1997 | Katz |
| 5,692,132 A | 11/1997 | Hogan |
| 5,699,528 A | 12/1997 | Hogan |
| 5,703,344 A | 12/1997 | Bezy |
| 5,704,044 A | 12/1997 | Tarter et al. |
| 5,708,422 A | 1/1998 | Blonder |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,450 A | 2/1998 | Ambrose |
| 5,717,989 A | 2/1998 | Tozzoli et al. |
| 5,724,424 A | 3/1998 | Gifford |
| 5,727,153 A | 3/1998 | Powell |
| 5,742,775 A | 4/1998 | King |
| 5,745,706 A | 4/1998 | Wolfberg et al. |
| 5,748,780 A | 5/1998 | Stolfo |
| 5,751,842 A | 5/1998 | Riach et al. |
| 5,757,904 A | 5/1998 | Anderson |
| 5,757,917 A | 5/1998 | Rose et al. |
| 5,758,126 A | 5/1998 | Daniels et al. |
| 5,761,647 A | 6/1998 | Boushy |
| 5,765,142 A | 6/1998 | Allred et al. |
| 5,770,843 A | 6/1998 | Rose |
| 5,774,553 A | 6/1998 | Rosen |
| 5,784,696 A | 7/1998 | Melnikof |
| 5,787,403 A | 7/1998 | Randle |
| 5,793,846 A | 8/1998 | Katz |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson |
| 5,815,551 A | 9/1998 | Katz |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |

| | | | | | | | |
|---|---|---|---|---|---|---|---|
| 5,832,488 | A | 11/1998 | Eberhardt | 6,058,378 | A | 5/2000 | Clark et al. |
| 5,835,580 | A | 11/1998 | Fraser | 6,058,380 | A | 5/2000 | Anderson et al. |
| 5,835,603 | A | 11/1998 | Coutts | 6,058,381 | A | 5/2000 | Nelson |
| 5,835,899 | A | 11/1998 | Rose et al. | 6,061,665 | A | 5/2000 | Bahreman |
| 5,842,211 | A | 11/1998 | Horadan | 6,065,675 | A | 5/2000 | Teicher |
| 5,852,812 | A | 12/1998 | Reeder | 6,067,524 | A | 5/2000 | Byerly et al. |
| 5,859,419 | A | 1/1999 | Wynn | 6,070,147 | A | 5/2000 | Harms et al. |
| 5,862,223 | A | 1/1999 | Walker et al. | 6,070,150 | A | 5/2000 | Remington et al. |
| 5,864,609 | A | 1/1999 | Cross | 6,070,798 | A | 6/2000 | Nethery |
| 5,870,456 | A | 2/1999 | Rogers | 6,073,104 | A | 6/2000 | Field |
| 5,870,721 | A | 2/1999 | Norris | 6,073,113 | A | 6/2000 | Guinan |
| 5,870,723 | A | 2/1999 | Pare | 6,076,072 | A | 6/2000 | Libman |
| 5,870,725 | A | 2/1999 | Bellinger et al. | 6,078,892 | A | 6/2000 | Anderson et al. |
| 5,873,072 | A | 2/1999 | Kight | 6,078,907 | A | 6/2000 | Lamm |
| 5,875,437 | A | 2/1999 | Atkins | 6,081,790 | A | 6/2000 | Rosen |
| 5,883,810 | A | 3/1999 | Franklin | 6,085,168 | A | 7/2000 | Mori et al. |
| 5,884,032 | A | 3/1999 | Bateman | 6,088,683 | A | 7/2000 | Jalili |
| 5,884,288 | A | 3/1999 | Chang | 6,088,685 | A | 7/2000 | Kiron |
| 5,890,140 | A | 3/1999 | Clark et al. | 6,088,686 | A | 7/2000 | Walker et al. |
| 5,897,625 | A | 4/1999 | Gustin | 6,092,056 | A | 7/2000 | Tull, Jr. et al. |
| 5,898,157 | A | 4/1999 | Mangili et al. | 6,098,052 | A | 8/2000 | Kosiba et al. |
| 5,899,982 | A | 5/1999 | Randle | 6,098,053 | A | 8/2000 | Slater |
| 5,903,881 | A | 5/1999 | Schrader | 6,098,070 | A | 8/2000 | Maxwell |
| 5,910,896 | A | 6/1999 | Hahn-Carlson | 6,100,891 | A | 8/2000 | Thorne |
| 5,910,988 | A | 6/1999 | Ballard | 6,101,486 | A | 8/2000 | Roberts et al. |
| 5,917,965 | A | 6/1999 | Cahill et al. | 6,105,011 | A | 8/2000 | Morrison, Jr. |
| 5,920,847 | A | 7/1999 | Kolling et al. | 6,108,639 | A | 8/2000 | Walker et al. |
| 5,923,745 | A | 7/1999 | Hurd | 6,110,044 | A | 8/2000 | Stern |
| 5,930,778 | A | 7/1999 | Geer | 6,111,858 | A | 8/2000 | Greaves et al. |
| 5,940,811 | A | 8/1999 | Norris | 6,115,690 | A | 9/2000 | Wong |
| 5,940,844 | A | 8/1999 | Cahill et al. | 6,119,106 | A | 9/2000 | Mersky et al. |
| 5,943,656 | A | 8/1999 | Crooks | 6,119,107 | A | 9/2000 | Polk |
| 5,945,653 | A | 8/1999 | Walker et al. | 6,125,354 | A | 9/2000 | MacFarlane et al. |
| 5,953,406 | A | 9/1999 | LaRue et al. | 6,128,602 | A | 10/2000 | Northington et al. |
| 5,956,700 | A | 9/1999 | Landry | 6,128,603 | A | 10/2000 | Dent et al. |
| 5,963,659 | A | 10/1999 | Cahill et al. | 6,129,273 | A | 10/2000 | Shah |
| 5,963,925 | A * | 10/1999 | Kolling et al. ................ 705/34 | 6,138,118 | A | 10/2000 | Koppstein et al. |
| 5,966,695 | A | 10/1999 | Melchione et al. | 6,144,946 | A | 11/2000 | Iwamura |
| 5,966,698 | A * | 10/1999 | Pollin ......................... 705/34 | 6,148,293 | A | 11/2000 | King |
| 5,970,467 | A | 10/1999 | Alavi | 6,149,056 | A | 11/2000 | Stinson et al. |
| 5,974,396 | A | 10/1999 | Anderson | 6,151,584 | A | 11/2000 | Papierniak et al. |
| 5,978,780 | A | 11/1999 | Watson | 6,157,924 | A | 12/2000 | Austin |
| 5,987,435 | A | 11/1999 | Weiss | 6,181,837 | B1 | 1/2001 | Cahill et al. |
| 5,987,436 | A | 11/1999 | Halbrook | 6,185,544 | B1 | 2/2001 | Sakamoto et al. |
| 5,987,439 | A | 11/1999 | Gustin et al. | 6,202,054 | B1 | 3/2001 | Lawlor et al. |
| 5,991,750 | A | 11/1999 | Watson | 6,205,433 | B1 | 3/2001 | Boesch et al. |
| 5,995,942 | A | 11/1999 | Smith et al. | 6,212,178 | B1 | 4/2001 | Beck et al. |
| 5,995,948 | A | 11/1999 | Whitford | 6,226,623 | B1 | 5/2001 | Schein et al. |
| 6,000,832 | A | 12/1999 | Franklin et al. | 6,227,447 | B1 | 5/2001 | Campisano |
| 6,003,762 | A | 12/1999 | Hayashida | 6,230,287 | B1 | 5/2001 | Pinard et al. |
| 6,006,207 | A | 12/1999 | Mumick et al. | 6,233,332 | B1 | 5/2001 | Anderson et al. |
| 6,006,208 | A | 12/1999 | Forst et al. | 6,233,566 | B1 | 5/2001 | Levine |
| 6,009,442 | A | 12/1999 | Chen et al. | 6,236,972 | B1 | 5/2001 | Shkedy |
| 6,014,636 | A | 1/2000 | Reeder | 6,240,444 | B1 | 5/2001 | Fin et al. |
| 6,016,344 | A | 1/2000 | Katz | 6,278,981 | B1 | 8/2001 | Dembo |
| 6,016,482 | A | 1/2000 | Molinari et al. | 6,289,322 | B1 | 9/2001 | Kitchen et al. |
| 6,018,722 | A | 1/2000 | Ray et al. | 6,292,789 | B1 * | 9/2001 | Schutzer ..................... 705/34 |
| 6,026,370 | A | 2/2000 | Jermyn | 6,301,379 | B1 | 10/2001 | Thompson et al. |
| 6,029,139 | A | 2/2000 | Cunningham et al. | 6,301,567 | B1 | 10/2001 | Leong et al. |
| 6,032,125 | A | 2/2000 | Ando | 6,304,653 | B1 | 10/2001 | O'Neil et al. |
| 6,032,133 | A | 2/2000 | Hilt et al. | 6,304,858 | B1 | 10/2001 | Mosler |
| 6,032,137 | A | 2/2000 | Ballard | 6,321,212 | B1 | 11/2001 | Lange |
| 6,035,281 | A | 3/2000 | Crosskey et al. | 6,338,047 | B1 | 1/2002 | Wallman |
| 6,035,285 | A | 3/2000 | Schlect et al. | 6,338,049 | B1 | 1/2002 | Walker et al. |
| 6,035,287 | A | 3/2000 | Stallaert et al. | 6,374,235 | B1 | 4/2002 | Chen et al. |
| 6,038,552 | A | 3/2000 | Fleischl et al. | 6,393,409 | B2 | 5/2002 | Young |
| 6,038,553 | A | 3/2000 | Hyde, Jr. | 6,405,173 | B1 | 6/2002 | Honarvar et al. |
| 6,041,312 | A | 3/2000 | Bickerton et al. | 6,405,179 | B1 | 6/2002 | Rebane |
| 6,041,315 | A | 3/2000 | Pollin | 6,415,259 | B1 | 7/2002 | Wolfinger et al. |
| 6,044,362 | A * | 3/2000 | Neely ......................... 705/34 | 6,415,267 | B1 | 7/2002 | Hagan |
| 6,049,782 | A | 4/2000 | Gottesman et al. | 6,418,419 | B1 | 7/2002 | Nieboer |
| 6,052,674 | A | 4/2000 | Zervides et al. | 6,418,420 | B1 | 7/2002 | DiGiorgio et al. |
| 6,055,510 | A | 4/2000 | Henrick | 6,418,430 | B1 | 7/2002 | DeFazio et al. |

| | | |
|---|---|---|
| 6,430,545 B1 | 8/2002 | Honarvar et al. |
| 6,456,983 B1 | 9/2002 | Keyes et al. |
| 6,480,850 B1 | 11/2002 | Veldhuisen |
| 6,490,568 B1 | 12/2002 | Omara et al. |
| 6,493,685 B1 | 12/2002 | Ensel et al. |
| 6,513,019 B2 | 1/2003 | Lewis |
| 6,553,113 B1 | 4/2003 | Dhir et al. |
| 6,574,377 B1 | 6/2003 | Cahill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,658,393 B1 | 12/2003 | Basch et al. |
| 6,704,714 B1 | 3/2004 | O'Leary et al. |
| 6,721,715 B2 | 4/2004 | Nemzow |
| 6,804,346 B1 | 10/2004 | Mewhinney |
| 2001/0018739 A1 | 8/2001 | Anderson et al. |
| 2001/0032158 A1 | 10/2001 | Starkman |
| 2001/0032159 A1 | 10/2001 | Starkman |
| 2001/0032176 A1 | 10/2001 | Starkman |
| 2001/0034682 A1 | 10/2001 | Knight et al. |
| 2001/0037309 A1 | 11/2001 | Vrain |
| 2001/0042034 A1 | 11/2001 | Elliott |
| 2001/0044293 A1 | 11/2001 | Morgan |
| 2001/0047334 A1 | 11/2001 | Nappe et al. |
| 2001/0047489 A1 | 11/2001 | Ito et al. |
| 2002/0012445 A1 | 1/2002 | Perry |
| 2002/0013728 A1 | 1/2002 | Wilkman |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0059141 A1 | 5/2002 | Davies et al. |
| 2002/0069134 A1 | 6/2002 | Solomon |
| 2002/0077978 A1 | 6/2002 | O'Leary et al. |
| 2002/0087468 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138398 A1 | 9/2002 | Kalin et al. |
| 2002/0170966 A1 | 11/2002 | Hannigan et al. |
| 2002/0178071 A1 | 11/2002 | Walker et al. |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0046218 A1 | 3/2003 | Albanese et al. |
| 2003/0097335 A1 | 5/2003 | Muskowitz et al. |
| 2003/0101119 A1 | 5/2003 | Persons et al. |
| 2003/0105641 A1 | 6/2003 | Lewis |
| 2003/0163403 A1 | 8/2003 | Chen et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2004/0078328 A1 | 4/2004 | Talbert et al. |
| 2004/0139016 A1* | 7/2004 | Forzley ............... 705/40 |
| 2005/0033690 A1 | 2/2005 | Antognini et al. |

FOREIGN PATENT DOCUMENTS

| | | |
|---|---|---|
| EP | 421808 | 4/1991 |
| EP | 1014318 | 6/2000 |
| JP | 7-152960 | 6/1995 |
| WO | WO91/16691 | 10/1991 |
| WO | WO93/08545 | 4/1993 |
| WO | WO 94/28497 | 12/1994 |
| WO | WO96/08783 | 3/1996 |
| WO | WO 96/12242 A1 | 4/1996 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 01 /86524 | 11/2001 |
| WO | WO 02/063432 A2 | 8/2002 |
| WO | WO02/063432 A3 | 8/2002 |
| WO | WO 2004/079603 | 9/2004 |

OTHER PUBLICATIONS

Anonymous, "Wells Fargo Rolls Out Nationwide Lockbox Check Conversion; Financial News" Apr. 22, 2003, PR Newswire Association.*

Block, Valerie; Blockbuster running test of a stored value card; The American Banker; Sep. 1, 1995.

Cardweb.com; Card Flash Daily Payment Card News;Sep. 23, 2004.

CES NaBANCO introduces stored value card technology; blockbuster video is first merchant partner; Business Wire; Jan. 15, 1996.

Priya, Malhotra; Clearing House Enumerates e-Payments Ills; American Banker; Aug. 13, 2002.

Fidelity Helps Fund Sellers Trim the Taxes They'll Owe; Wall Street Journal; Nov. 7, 2002.

First Data markets stored-value cards; Cards International; Jan. 30, 1996.

Norris, Melinda; First Data unit develops blockbuster cash card; Omaha World Herald; Sunrise Edition; Jan. 19, 1996.

Nokia Announces the World's First NFC Enabled Mobile Product for Contactless Payment and Ticketing; Feb. 9, 2005; http://www.prnewswire.com/cgi-bin/sotries.pl?ACCT=109&STORY=www/story/02-09-2005/002989077&EDATE.

Goode, Erica; On Profit, Loss and the Mysteries of the Mind; The New York Times; Nov. 5, 2002.

Payment Data Systems Files Patent on Debit Card Payment Solution; The New York Times; Mar. 5, 2004.

Maher, Angela et al; Payer's Prescription for Painless Migration to electronic Healthcare Payments and Remittance Advices; PNC Bank; Dec. 2001.

Maher, Angela et al; Payer's Prescription for Painless Migration to Receipt of Electronic Healthcare Payments and Remittance Advices; PNC Bank; Dec. 2001.

Zuckerman, Gregory; The Hedge-Fund Craze; The Wall Street Journal online; Jun. 12, 2002.

McDonald, Ian; The Stars in the Sky Flicker, And Fund Stars Do the Same; The Wall Street Journal; date unknown.

Visa & Carnegie Mellon Plan Online Payment Scheme; Newsbyte News Network; Feb. 15, 1995.

Financial News; Wells Fargo Rolls Out Nationwide Lockbox Check Conversion; PR Newswire Association; Apr. 22, 2003.

Silverman, Rachel-Emma; IRS Blesses Accounts That Let Donors Keep Managing Money They've Given to a Charity; Oct. 6, 2004.

Harsh Truth: Your Investments Likely Won't Make Any Money; date unknown; author unknown; publication unknown.

"2004 ACH Rules", Corporate Edition, National Automated Clearing House Association, 2004.

Annual Report Pursuant to Sectin 13 or 15(D) of the Securities Exchange Act of 1934, Form 10-K, Intelidata Technologies Corporation, Fiscal Year Ended Dec. 31, 2001.

Anonymous; Chase Manhattan Introduces New FEDI Payables Product, Proquest Document ID: 7806951, ISSN/ISBN: 02686635, May 1995.

Anonymous; Chasing the Global Trend, Cash Management News, Proquest Document ID 9319923, ISSN/ISBN: 02686635, Dec. 1995.

Anonymous; Operating in a Multi-Currency Environment, Proquest Document ID 9215937, ISSN/ISBN 09589309, Oct. 1995.

Anonymous; Systems Spell Change for Foreign Exchange, Global Investor, Proquest Document ID 1056152B, ISSN/ISBN: 09513604, Nov. 1996.

Anonymous; Visa & Carnegie Mellon Plan Online Payment Scheme, Newsbyte News Network, Feb. 15, 1995.

Bills; Chase Pact Done, What's Next for Web Vendors?, The American Banker, Technology Section, Jun. 3, 2002, p. 23.

Blockbuster Running Test of a Stored Value Card, The American Banker, Sep. 1, 1995.

Card Flash Daily Payment Card News, www.cardweb.com, Printed Sep. 23, 2004.

Carreker; Electronic Check Presentment: Capturing New Technology, http://proquest.umi.com, Banking Management, Rolling Meadows: vol. 71, Issue 2, Mar./Apr. 1995, p. 32, 5 Pages.

Computer Telephony Solutions; The Customer Interaction Specialists, Computer Telephony Solutions, Internet, May 25, 1999.

Decovny; Net Scope, Banking Technology, May 1997.

Delivering the Right Information to the Right Resource or Every Customer Interaction; Intelligent Callrouter, www.geotel.com/solutions/icr/default/htm, 1998, 1 Page.

Du Pont's Electronic Payments, Corporate EFT Report, V9, N1, Dialog File 636, Accession No. 01066902, Jan. 11, 1989.

French; Tech Stocks: Market Movers, Investors Worry Checkfree Being Chased From its Own Game, http://www.thestreet.com, Jun. 20, 2002.

Global Corruption Report 2004, Transparency International, Pluto Press, www.globalcorrupt, ISBN 07453 2231, Jun. 26, 2005.

Gluck; Creating a Global Cash-Management Game Plan, Bank Systems & Technology, Feb. 1997, p. 28.

Keep the Change Savings Service, Bank of America, Retrieved From the Internet on Jan. 27, 2006 at <https://www.bankofamerica.com/deposits/checksave/apps/ktc/ktc_terms.cfm>.

Lamond, Keith; Credit Card Transactions Real World and Online, http://www.virtualschool.edu/mon/electronicproperty/klamond/credit_card.htm, pp. 1-17, Printed Jul. 8, 2005.

Malhotra; Clearing House Enumerates E-Payments Ills, The American Banker, vol. 167, No. 154, Aug. 23, 2002.

Marjanovic; Corporate Services: Chase Gears up Global Payments System Series: 16, The American Banker, vol. 160, Issue 174, Sep. 11, 1995, p. 41.

Money, Initial Launch to 200 Credit Unions, USA Today.com, Jun. 27, 2002.

Press Release, Mar. 5, 2004, Payment Data Systems Files Patent on Debit Card Payment Solution, American City Business Journals, Inc., Mar. 5, 2004.

Rial, Astrid; How to Monitor Collectors, Credit Card Management, Jul. 2000, vol. 13, Iss. 3:p. 65, 4 Pages.

Technology, In Brief Wachovia-Intelidata Deal, May 7, 2002.

\* cited by examiner

201 — Biller XYZ — CouponPAY

Your account# at XYZ    xxxxx078 — 202

DDA#: XXXXXXXX76!    ABA#: 021000021

MNO BANK
Check box to pay this amount

Please fill in any address changes on back

Mr. Customer
895 Main Street
Fayetteville, NC 27893

203 — Total amount due    $ 7,319.60 ☐
204 — Minimum Amount Due    $ 19.00 ☐
205 — Pay Another Amount    $ _____ ☐

If using a check, make payable to:
XYZ Company
Central Towers, Suite 100
San Francisco, CA 94111

206 — Payment Due Date    8/17/03

207 — TO AUTHORIZE, SIGN BELOW:
_____

Preprinted instructions for CouponPAY on reverse

COUPON PAYMENT SYSTEM

CROSS REFERENCE TO RELATED APPLICATIONS

This application claims the benefit of U.S. Provisional Application Ser. No. 60/494,307, filed by Stanley et al. on Aug. 11, 2003 and entitled "Coupon Payment System", which is incorporated herein by reference.

FIELD OF THE INVENTION

The present invention relates generally to electronic payment, and, more particularly, to methods and systems for providing coupon payments as an alternative to payments made with paper checks.

BACKGROUND OF THE INVENTION

Every day millions of bills are received in the mail and then paid by check. However, there are numerous difficulties associated with this practice. A check may be stolen in the mail and cashed by someone other than the payee. The account number may be copied from the check and later used to commit fraud. There is also considerable cost and time delay when checks are used as the payment method. The check clearing process usually takes several days, and checks must be physically handled and stored. Furthermore, many banks mail cancelled checks back to their customers, which is yet another cost involved in using checks.

In recent years, various methods have been developed to electronically make bill payments without checks. One such method is called direct deposit. In this scheme, a specified amount is deducted from the customer's checking account on a specified date, and transferred to a billing entity. However, the bill is automatically paid without review by the customer.

There are also several ways to pay recurring bills via the Internet. When a particular bill is to be paid, the bill is forwarded to a bill payment system. The bill then is either automatically paid or it is presented to the customer online and then the customer selects the bill for payment. An example of such a bill payment system is described in U.S. Pat. No. 6,289,322 to Kitchen et al., entitled "Electronic Bill Processing," and assigned to CheckFree Corporation. Although many individuals use such bill payment systems, drawbacks include the necessity to deviate from the usual bill paying method and the requirement that the customer have Internet access. Moreover, many people feel uncomfortable about making online payments.

SUMMARY OF THE INVENTION

As an alternative to bill payments made with paper checks, customers are provided with payment coupons along with their statements. A customer elects to pay the bill either by check or by returning the payment coupon. The payment coupon will not contain the customer's checking account information. However, the payment amount indicated on the payment coupon will subsequently be deducted from the customer's checking account. Preferably, bill payments will be made through the Automated Clearing House (ACH) which is an efficient and less expensive alternative to the traditional check clearing process.

According to a first aspect of the invention, a computer-implemented method for providing coupon payments as an alternative to payments made with checks, includes the steps of determining whether a bill is eligible for coupon payment; generating a coupon for the bill, if it is determined that the bill is eligible for coupon payment; receiving the coupon from a customer, the coupon including the customer's election to make the coupon payment for the bill; and paying the bill using a check-less payment network, in accordance with information from the coupon. According to a second aspect of the invention, a bill is considered eligible for coupon payment based on bill payment history or certain characteristics of the bill. Eligible bills include utility bills, mortgage bills, credit card bills, automobile financing bills, and bills for most other types of recurring payments.

According to a third aspect of the invention, the payment coupon and the bill are mailed to the customer. According to a fourth aspect of the invention, the payment coupon and the bill are included in the same envelope.

According to a fifth aspect of the invention, the payment coupon includes at least a portion of the customer's billing account information. According to a sixth aspect of the invention, the payment coupon includes an amount to be paid. According to a seventh aspect of the invention, checking account information is absent from the payment coupon. According to an eighth aspect of the invention, the payment coupon includes a portion to indicate election of payment by either coupon or check.

According to a ninth aspect of the invention, the check-less payment network includes the Automated Clearing House (ACH). According to a tenth aspect of the invention, a billing entity matches the customer account number against a list of eligible customer account numbers. According to an eleventh aspect of the invention, customer account numbers are encrypted. According to a twelfth aspect of the invention, the list of eligible account numbers is created by an Originating Depository Financial Institution (ODFI). According to a thirteenth aspect of the invention, the payment is debited from the customer's checking account.

These and other aspects, features and advantages of the present invention will become apparent from the following detailed description of preferred embodiments, which is to be read in connection with the accompanying drawings.

BRIEF DESCRIPTION OF THE DRAWINGS

FIG. 2 is an exemplary Coupon; and

DESCRIPTION OF PREFERRED EMBODIMENTS

Throughout the disclosure various terms and expressions are used with meanings as per the following definitions:

Automated Clearing House (ACH): a secure, private network that connects banks to one another by way of various ACH operators. This network enables electronic payments, such as automatic payroll deposits and debit card purchases, to be handled and processed. Operating details of the ACH are well-known within the financial services industry, and are documented in 2004 ACH Operating Rules & Guidelines, published by NACHA, which is incorporated herein by reference.

Originator: Any individual, corporation or other entity that initiates entries into the Automated Clearing House (ACH).

An example of an Originator is a Biller that initiates bill payments from customers who have elected to use Coupon Payments to pay their bills.

Originating Depository Financial Institution (ODFI): A participating financial institution that originates ACH entries at the request of and by agreement with its customers.

Receiving Depository Financial Institution (RFDI): Any financial institution qualified to receive ACH entries that agrees to abide by the NACHA Operating Rules and Guidelines It is to be understood that the present invention may be implemented in various forms of hardware, software, special purpose processors, or a combination thereof. Preferably, the present invention is implemented in a high-level programming language such as C, C++, COBOL, or Java. The software of the invention is tangibly embodied on various program storage devices. The programs are uploaded to, and executed by, a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or combination thereof) which is executed via the operating system. In addition, various other peripheral devices may be connected to the computer platform such as additional data storage devices, printing devices, and Magnetic Ink Character Recognition (MICR) devices for reading encoded information printed on the surface of an envelope, statement, check, or coupon.

Figure 1:
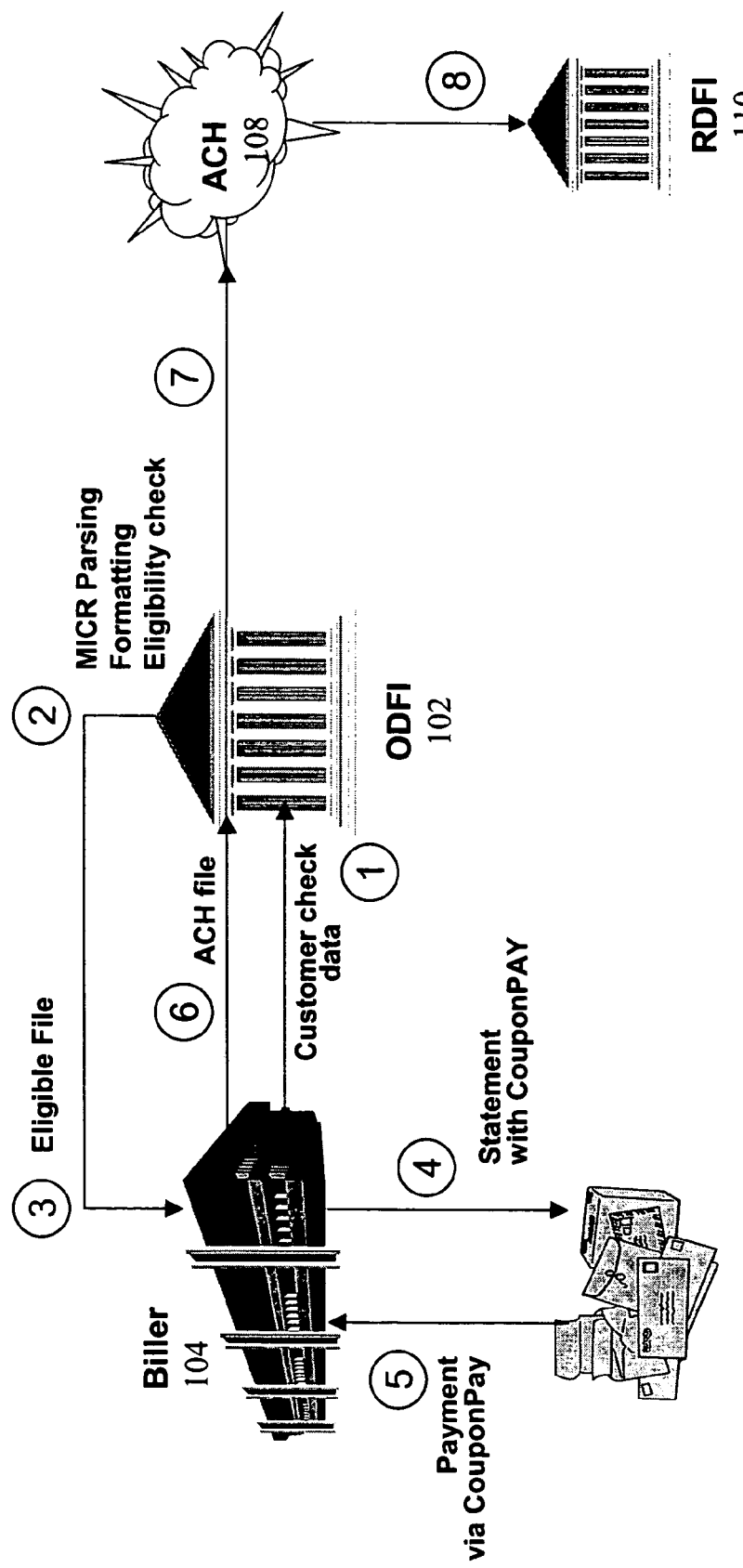
FIG. 1 is a diagram illustrating an exemplary system for paying bills using Coupon Payments.

Referring to FIG. 1, a diagram illustrating an exemplary system for paying bills using Coupon Payments is illustrated. The system includes an ODFI 102, a Biller 104, a Customer 106, and an RFDI 110. The OFDI 102 is the financial institution that receives payment instructions from the Biller 104. In this capacity, the Biller 104 acts as an "Originator." The OFDI 102 forwards entries via the ACH 108 to the RFDI 110. The RFDI 110 is the depository financial institution that participates in the ACH system to initiate entries in the Biller's 104 account. Although the diagram shown in FIG. 1 includes a single Customer 106 associated with only one Biller 104, it is to be appreciated that there will generally be several Customers 106 each associated with various Billers 104. The diagram of FIG. 1 is provided for illustrative purposes.

In operation, the Biller 104 periodically forwards customer check data to the ODFI 102. This customer check data is compiled from the bills paid by check by the Customers 106. This customer check data will include historical payment information for each bill payment made by check to the Biller 104.

(Step 1).

At the OFDI 102, the customer check data are examined to determine which bills are eligible for coupon payment in subsequent billing cycles. Coupon payment eligibility involves a determination as to whether the Customer's 106 bill payments are recurring (e.g., a periodic bill payment) and are capable of being processed through the ACH 108. If the payment is determined to be recurring, MICR information from the customer's check is then read. This information includes the customer's checking account number and routing number. This information is formatted into an ACH-format, and the ODFI 102 then runs a test to determine whether the bill could have been paid through the ACH 108. If it passes this test, the billing information and the Customer's 106 checking information are added to an entry in an "Eligible" File. (Step 2).

Next, the Eligible File is transmitted from the ODFI 102 to the Biller 104. Only bills that the Biller 104 is responsible for are provided to the particular Biller 104. (Step 3) The Biller 104 may then append coupons to the bills matched against the Eligible File, starting in the next billing cycle. (Step 4)

When the Customer 106 receives his or her next statement, it will include the payment coupon. The Customer 106 elects to pay the bill either in the conventional manner (by check) or by submitting the Coupon (without a check). (Step 5).

The Biller 104 receives the bill payment. If it was made by check, the bill is processed according to the conventional check-clearing process. However, if the Customer 106 elected to pay the bill via payment coupon, then the payment is forwarded by the Biller 104 to the ODFI 102 (Step 6), and then to the ACH 108 (Step 7). Finally, the ACH 108 requests that the payment amount be added to the Biller's 104 account by the RFDI 110 (Step 8).

An exemplary Coupon 200 is shown in FIG. 2. As depicted, the Coupon 200 includes a Biller identifier 201 (e.g., Biller XYZ), the customer's account number 202, a total amount due 203, a minimum amount due 204, a specific payment amount 205, a payment due date 206, and a signature line 207. To pay the bill using the Coupon 200, the Customer 106 would simply indicate the amount to be paid by checking one of the payment choices 203-205 (and, in the case of payment of a specific amount, write the amount to be paid) and sign the Coupon 200 at the signature line 207. The Coupon 200 would then be returned by the Customer 106 via U.S. Mail to the Biller 104.

Unlike conventional schemes, the present invention does not need to include full customer account information (or other "sensitive" personal data) on any document sent through the U.S. Mail or even transmitted through the billing system. For example, the Coupon 200 may include only a "masked" version of the customer account number 202 (such as the last few digits as an identifier only). Digits that are not revealed may be substituted by other characters (e.g., an 'X'). While the customer bank account number can be decoded through a biller identifier (e.g., the customer account number), the Biller 104 can also be provided with a software utility to derive the financial information securely and privately. When the Biller 104 receives the remittance from the customer (including the Coupon 200), the Biller 104 identifies the customer and the receipt of payment. The Biller 104 then matches the customer with the encrypted version of the customer's bank account number. The encrypted version of the bank account number is then sent to the ODFI 102, where it will be decrypted. It should be appreciated that other sensitive information (financial or otherwise) may also be similarly processed.

Figure 3:
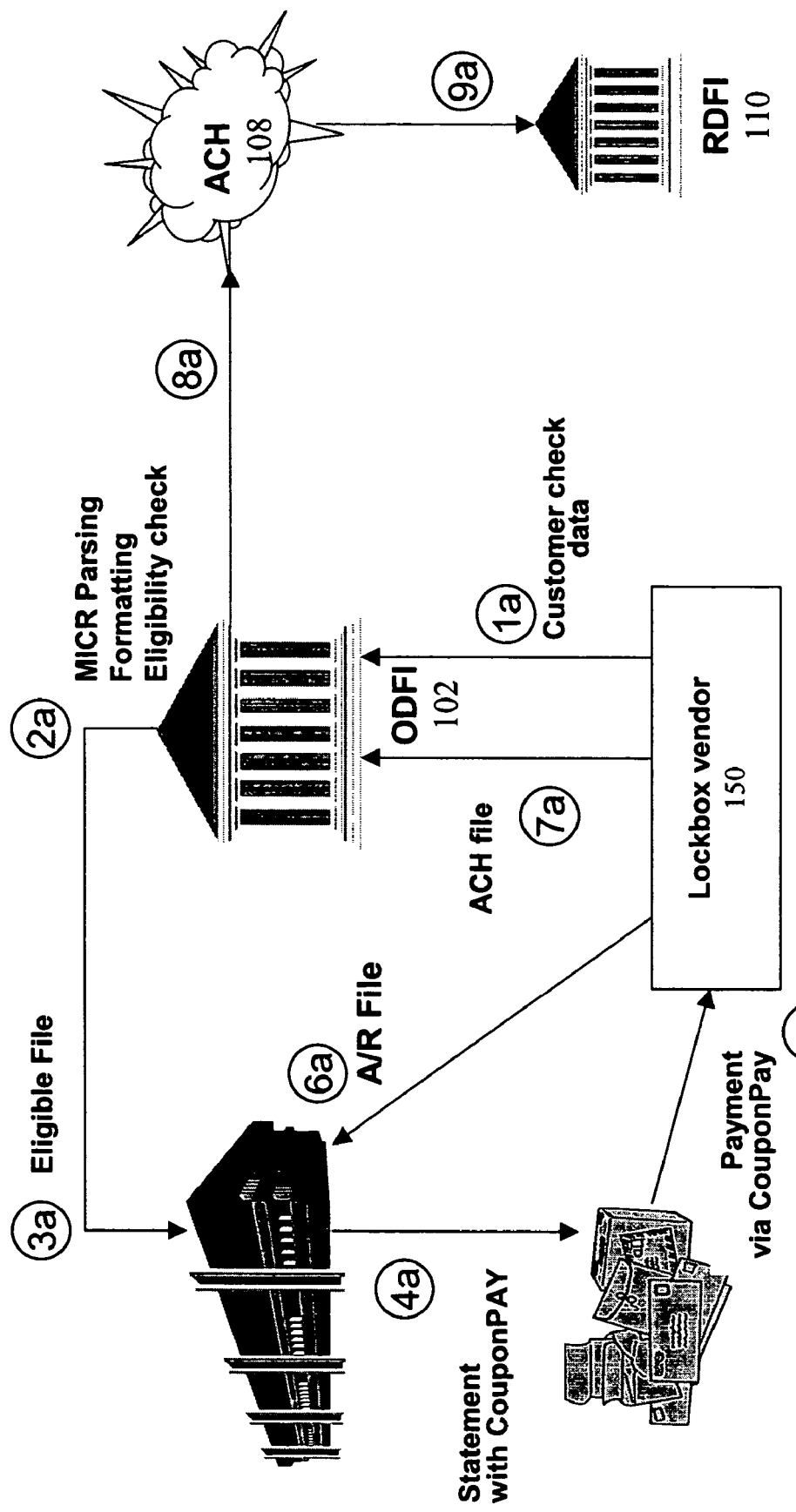
FIG. 3 is a diagram illustrating another exemplary embodiment of the present invention in which aspects of payment processing are outsourced.

Referring to FIG. 3, an alternate embodiment of the present is illustrated. In this example, a Lockbox Vendor 150 is provided to carry out much of the payment processing.

As depicted in FIG. 3, the customer check data is transmitted from the Lockbox Vendor 150 to the ODFI 102. (Step 1a). As before, the ODFI 102 analyzes this customer check data to determine eligibility for coupon payment in subsequent billing cycles. As mentioned, if the bill payment history indicates that the bill is for recurring payments, MICR information from the check is obtained to produce a test against the ACH 108. If it passes the test, the billing information and the Customer's 106 checking information are added to an entry in an "Eligible" File. (Step 2a).

Next, the Eligible File is transmitted from the ODFI 102 to the Biller 104. Only bills that the Biller 104 is responsible for are provided to the particular Biller 104. (Step 3a) The Biller 104 may then append coupons to the bills matched against the Eligible File, starting in the next billing cycle. (Step 4a)

When the Customer 106 receives his or her next statement, it will include the payment coupon. The Customer 106 elects to pay the bill either in the conventional manner (by check) or by submitting the Coupon (without a check). (Step 5a).

However, instead of the Biller 104 receiving the bill payment, this step will be outsourced to the Lockbox Vendor 150. In other words, the Lockbox Vendor 150 receives and processes the payment. If it was made by check, the bill is processed according to the conventional check-clearing process. However, if the Customer 106 elected to pay the bill via payment coupon, then notification of the payment is sent by the Lockbox Vendor 150 to the Biller 104 (Step 6a) and the payment is forwarded by the Lockbox Vendor 150 to the ODFI 102 (Step 7a), and then to the ACH 108 (Step 8a). Finally, the ACH 108 requests that the payment amount be added to the Biller's 104 account by the RFDI 110 (Step 9a).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-implemented method for providing coupon payments as an alternative to payments made with checks, comprising the steps of:
   determining whether a bill is eligible for coupon payment;
   generating a coupon for the bill, if it is determined that the bill is eligible for coupon payment;
   receiving the coupon from a customer, the coupon including the customer's election to make the coupon payment for the bill; and
   paying the bill using a check-less payment network, in accordance with information from the coupon.

2. The method of claim 1, wherein the generating step includes mailing the coupon and the bill to the customer.

3. The method of claim 2, wherein the coupon and the bill are included in the same envelope.

4. The method of claim 1, wherein the coupon includes at least a portion of the customer's billing account information.

5. The method of claim 1, wherein the coupon includes an amount to be paid.

6. The method of claim 1, wherein checking account information is absent from the coupon.

7. The method of claim 1, wherein the coupon includes a portion of the coupon to indicate election of payment by either (a) coupon payment or (b) check payment.

8. The method of claim 1, wherein the payment is debited from the customer's checking account.

9. The method of claim 1, wherein the determining step includes determining whether a bill is eligible for coupon payment based on one of a bill payment history and a characteristic of the bill.

10. The method of claim 9, wherein the bill is determined to be eligible for coupon payment if the bill payment history indicates that the bill is for recurring payments to the same entity.

11. The method of claim 9, wherein the characteristic includes the type of the bill.

12. The method of claim 11, wherein the bill is determined to be eligible for coupon payment if the bill type is one of a utility bill, a mortgage bill, a credit card bill, and an automobile financing bill.

13. The method of claim 1, wherein the check-less payment network includes Automated Clearing House (ACH) network.

14. The method of claim 13, wherein the list of eligible accounts is created by an Originating Depository Financial Institution (ODFI).

15. The method of claim 1, wherein the determination step includes matching the customer account number to a list of eligible customer account numbers that are eligible for coupon payments.

16. The method of claim 15, wherein the customer account numbers are encrypted.

17. The method of claim 15, wherein the determination step is performed by a billing entity.

* * * * *